Dec. 2, 1941.  J. T. CARLSON  2,264,275
POWER FAILURE PROTECTIVE SYSTEM
Filed April 22, 1939  2 Sheets-Sheet 1
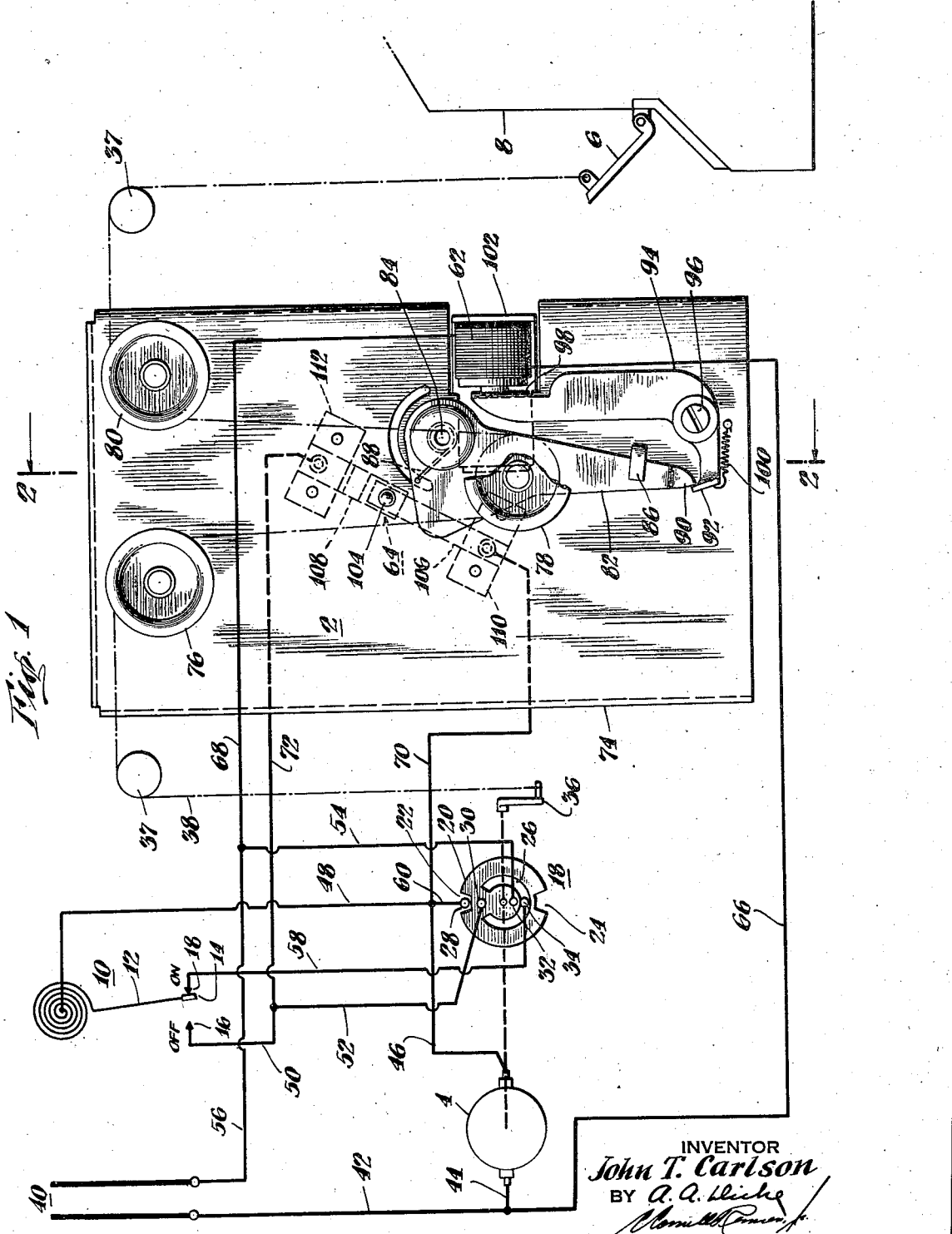
INVENTOR
John T. Carlson
BY
ATTORNEYS Dec. 2, 1941.    J. T. CARLSON    2,264,275
POWER FAILURE PROTECTIVE SYSTEM
Filed April 22, 1939    2 Sheets-Sheet 2
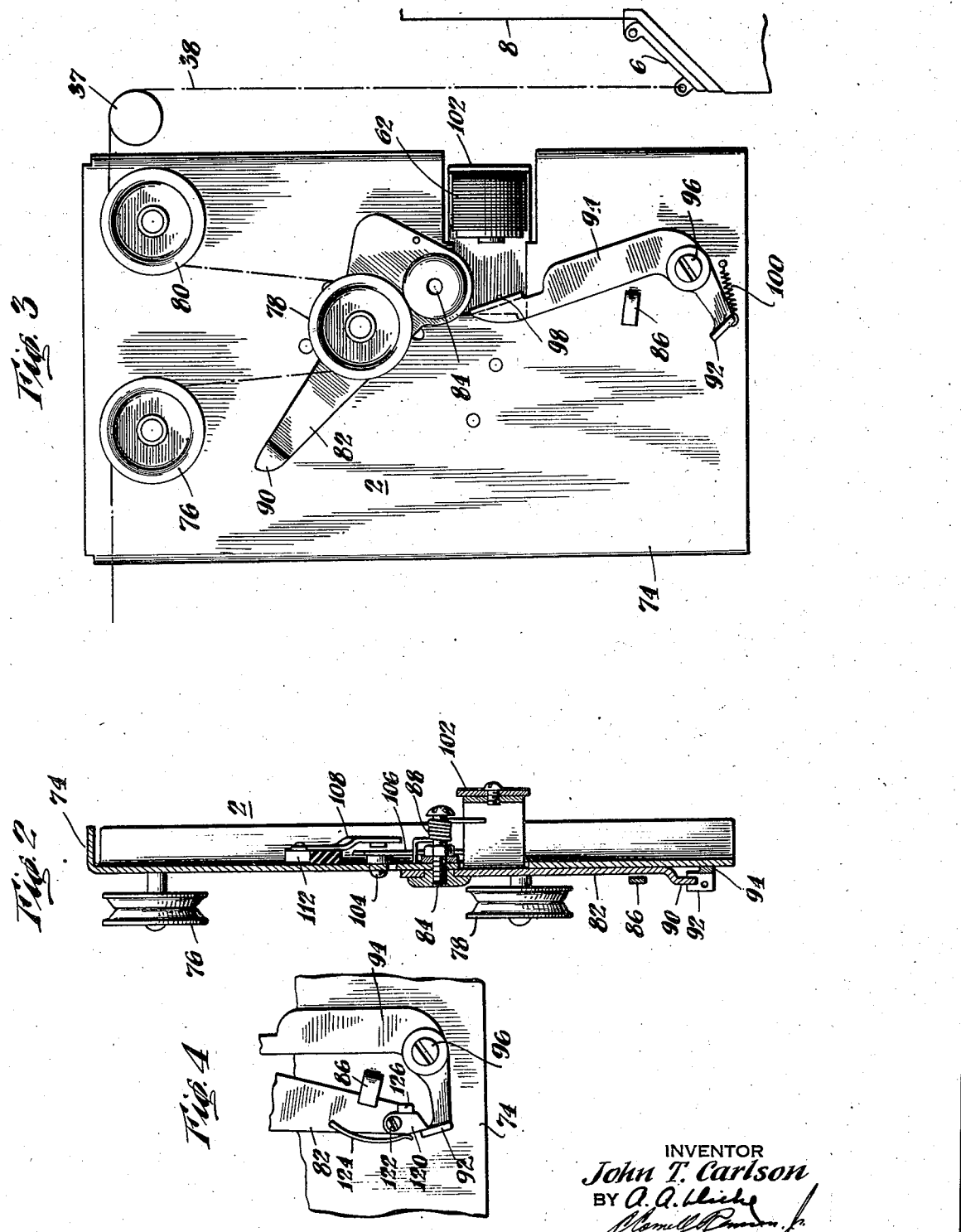
INVENTOR
John T. Carlson
BY
ATTORNEYS Patented Dec. 2, 1941

2,264,275

UNITED STATES PATENT OFFICE 2,264,275

POWER FAILURE PROTECTIVE SYSTEM

John T. Carlson, Dayton, Ohio, assignor to The Master Electric Company, a corporation of Ohio Application April 22, 1939, Serial No. 269,549

15 Claims. (Cl. 236—74)

This invention relates to a power failure protective system, and more particularly to a system and device for the protection of electrically controlled heat-producing apparatus upon the occurrence of a power failure.

An object of this invention is the provision of an improved safety damper control system.

Another object of this invention lies in the provision of an improved device which will automatically close the electrically controlled dampers of a furnace upon power failure.

A further object of this invention is the provision of a power failure protective system for electrical damper controlling apparatus which will automatically suitably prepare the control circuit for proper action upon the restoration of power.

A more specific object of this invention is the provision of a device for automatically closing the damper of a furnace upon power failure, even though the damper controlling system is in its damper opening position.

These and other features, capabilities and advantages of the invention will appear from the subjoined detailed description of one embodiment and a modification thereof, illustrated in the accompanying drawings, in which:

Fig. 1 illustrates the circuit connections of my novel power failure protective system, the power failure switch thereof being drawn to an exaggerated scale;

Fig. 2 is a cross-sectional view along the line II—II of the switch illustrated in Fig. 1;

Fig. 3 is a partial view of the control system illustrated in Fig. 1, showing the power failure switch and damper in another position; and Fig. 4 is a front view of a portion of the power failure switch illustrated in Fig. 1, showing a modified constructional detail.

Referring generally to the damper control system illustrated in Fig. 1, it will be noted that my power failure protective switching device 2, more particularly described hereinafter, is adapted to be connected between the motor 4 which controls the draft damper 6 of a furnace generally indicated at 8. The protective device 2 is adapted to be used with the usual damper controlling apparatus which may consist of a control thermostat 10, usually a room thermostat, a circuit commutating device 18 rotated by the damper motor 4, and the control arm 36 interconnected with the damper over suitably positioned means such as pulleys 37 by means of a chain or other connecting device 38.

The furnace damper 6 is illustrated in its raised position due to the fact that the control thermostat 10 is in its "on" position. At this time no electrical circuits will be established. If, however, the room thermostat moves to its "off" position the damper motor 4 will be energized to rotate the crank 36 upwardly and thus lower the damper 6 to its closed position. Such a circuit can be traced from one side of the source of power 40, conductors 42 and 44, damper motor 4, conductors 46 and 48, arm 12 and contacts 14 and 16 of the thermostat 10, conductors 50 and 52, brush 30, contacting plate 20 and brush 32 of the commutating device 18, and conductors 54 and 56 to the other side of the source of power. The motor thus being energized, will start to raise the arm 36, thus lowering the damper 6 and at the same time rotate the commutating device 18. After this commutating device has been rotated to a slight degree, control of the motor 4 is taken away from the room thermostat 10 to insure closing of the damper despite the fact the room thermostat may have moved from the "off" position. A circuit is established from one side of the source of power 40, through conductors 42 and 44, damper motor 4, conductors 46 and 60, brush 28, conducting plate 20 and brush 32 of the commutating device 18 and conductors 54 and 56 to the other side of the source of power 40. It will be noted that shortly after the brush 28 makes contact with the conducting plate 20, the brush 30 through which the circuit including the room thermostat 10 was first established, will meet the cut-out or insulated portion 26 of the commutating device 18, thus breaking the circuit. The damper motor will, however, continue to run until the brush 28 meets the cut-out portion 24 of the commutating device 18. This breaks the circuit to the damper motor, providing the room thermostat has remained in its "off" position, and the damper 6 will remain closed until a contrary call is received from the thermostat 10. If now, the thermostat moves to its "on" position a circuit for rotating the damper motor 4 to raise the damper will be established from one side of the source of power 40, conductors 42 and 44, damper motor 4, conductors 46 and 48, arm 12 and contacts 14 and 18 of the thermostat 10, conductor 58, brush 34, contacting plate 20 and brush 32 of the commutating device 18, and conductors 54 and 56 to the other side of the source of power 40. Again, after slight rotation of the commutating device 18, a circuit is established for the damper motor, which insures its continuous energization until the damper 6 is raised, despite a contrary movement by the room thermostat 10. This circuit will be established from one side of the source of power 40, conductors 42 and 44, damper motor 4, conductors 46 and 60, brush 28, which has now moved out of the cut-out section 24, contacting plate 20 and brush 32 of the commutating device 18, and conductors 54 and 56 to the other side of the source of power 40. The damper motor will accordingly run until the brush 28 enters into the cut-out portion 22, at which time the damper will be in its open position. After a short movement of the commutating device 18, the previously energized brush 34 moves into the slot 26 and thus breaks the circuit to the room thermostat.

It will be noted from the aforedescribed operation of the damper controlling system that no mention was made of the power failure protective switching device 2, which, however, was at that time electrically interconnected with the control circuit through conductors 66, 68 and 70 and 72, and mechanically by the fact that the chain or cord 38 interconnecting the rotating arm 36 of the damper motor with the damper 6, passed over pulleys 76, 78 and 80 of the control mechanism. This accordingly shows that for normal operation the device 2 plays no part in the damper control system, but, as hereinafter set forth, is only effective when necessary upon a power failure.

Before describing the manner in which the device 2 is controllably connected to the damper control circuit, a description of this device will first be given. As more specifically illustrated in Figs. 1 and 2, upon a suitable plate 74, are rotatably mounted a pair of free pulleys 76 and 80, and a lever arm 82, shown as pivotally connected thereto at 84. The plate 74 is also provided with a stop 86 for limiting motion of the lever arm 82 in the counter-clockwise direction as seen in Fig. 1. A suitable spiral spring 88 tends to urge the lever arm 82 against the stop 86. As shown in Fig. 1, the lever arm 82 is also provided with a free pulley 78 and urged in the clockwise direction due to the weight of the raised damper 6 transmitted to the pulley 78 by chain 38 passing over the pulleys 76 and 80. This motion is restrained, however, by the fact that the point 90 of the lever arm 82 engages the extended part 92 of a second lever 94, also pivotally mounted on the plate 74 as at 96, but held against counter-clockwise movement by the co-action of a poleface 98 with the energized solenoid 62. It is to be noted at this point, that the spring 88 urging the lever arm 82 in the counter-clockwise direction is not strong enough to overcome the clockwise force exerted by the weight of the damper 6 when in its raised position. Accordingly, in the position of the part shown the clockwise motion of the lever arm 82 is only restrained by the engagement of its point 90 with the extension 92 of the second lever 94. It is also to be noted that the strength of the spring 100 is not sufficient to overcome the attractive force of the solenoid 62, but is only used to insure a positive movement of the lever 94 upon the de-energization of the solenoid 62. As illustrated, the solenoid 62 is also mounted upon the plate 74 by any suitable means, such as bracket 102.

Suitably mounted upon the rear of the plate 74 of the device 2, is a switch 64. The switch 64 is preferably actuated by means of a button 104 projecting through the plate and extending outwardly from the front thereof. The button 104 is mounted upon a contact arm 106 which, when pressed inwardly by pressure upon the button 104 is adapted to contact a second contact arm 108. The contact arms 106 and 108 may be suitably mounted upon the rear of the plate 74 by means indicated as insulating members 110 and 112 respectively.

As will be noted from a comparison of Figs. 1 and 3, the button 104 of the switch 64 lies in the path of rotation of the lever arm 82. Accordingly, when the lever arm 82 is released upon the de-energization of the solenoid 62 and rotates in a clockwise direction through the weight of the damper 6 acting upon the pulley 78, the button 104 will be depressed by the lever arm 82 and thus establish contact between the switch arms 106 and 108.

Referring now to Fig. 1, it will be noted that the solenoid 62 of the protective switching device is directly connected to the source of power 40 by conductors 42, 66, 68 and 56. Therefore, as long as power is being supplied to the damper control circuit, the solenoid 62 will remain energized and hold the lever arm 94 in a suitable position to restrain movement of the lever arm 82. Assuming that in response to movement of the thermostat 10 to its "on" position the damper motor 4 has already raised the draft damper 6, the various elements of the damper control system will be in the position illustrated in Fig. 1. If now a power failure occurs, and the damper control were directly connected to the damper 6, these parts would remain in the same position, since due to such power failure, the control circuit would not be effective. The damper 6 would therefore remain open despite a contrary call of the thermostat 10, and the house or other structure would become overheated, and perhaps overheated to such a degree, as to create the grave possibility of a fire.

The use of the protective switching device 2, as connected in Fig. 1 entirely avoids this dangerous possibility. Upon failure of the power source, the solenoid 62 will become de-energized, and the spring 100 will rotate the lever arm 90 in a counter-clockwise direction to release the lever arm 82. The raised damper 6, however, will, through its weight, pull the lever arm 82 in a clockwise direction and, at the same time, close the draft of the furnace.

The relative movement of the pulley 78 on the lever arm 82 and the movement of the draft 6 are so proportioned, as seen for example in Fig. 3, that the upper position of the lever arm 82 is such as will permit complete closing of the draft 6. It will therefore be seen, that in the event of a power failure when the furnace drafts are open, these drafts will be immediately closed and all danger of overheating is removed. If, of course, the draft is in its closed position upon the occurrence of power failure, no upward force will be exerted on the lever arm 82 and the spring 88 is sufficient to maintain the lever arm in its downward position even though the solenoid 62 becomes de-energized and releases the stop 92. Accordingly, one important feature of this device lies in the fact that it is only effective when necessary, and permits the normal operation on the damper control at all other times.

Upward movement of the lever arm 82 upon failure of power not only is effective to close the furnace damper 6, but, by depressing the button 104 of the switch 64, establishes a circuit to restore normal control of the damper controlling apparatus upon the recurrence of the power. It is also effective to return the elements of the device 2 to their original position for further control upon the event of another power failure. If it is assumed that the damper motor 4, room thermostat 10, commutating device 18 and damper actuating lever 36, are in their position shown in Fig. 1 and, due to power failure, the lever arm 82 has moved upwardly to close the damper 6 as shown in Fig. 3, upon the return of power to the line 40, a circuit for the damper motor will then be established from one side of the source of power 40, conductors 42 and 44, damper motor 4, conductors 46 and 70, switch arms 106 and 108, conductors 72 and 52, brush 30, conducting plate 20 and brush 32 of the commutating device 18 and conductors 54 and 56 to the other side of the source of power 40. The damper motor 4 will accordingly rotate to raise the damper controlling arm 36 and thus produce slack in the chain or cord 38. The tension on the pulley 78 due to the weight of the damper 6 is accordingly released and the spring 88 will then be effective to return the lever 82 in a counter-clockwise direction to its original position. The stop 92 on the lever arm 94 will not prevent this action since, as is clearly seen in Fig. 3, the pole-face 98 on the lever arm 94 has been moved away from the solenoid 62 to such an extent that the re-energization of the solenoid is ineffective to lock the lever arm in its controlling position until the lever arm 82 has substantially reached the end of its counter-clockwise movement. At this point a cam action between the edges of the levers 82 and 94 will take place to move the pole-face 98 of the lever 94 within range of the pulling power of the solenoid 62 and the lever 94 will then be moved into its locking position as shown in Fig. 1.

If, after the aforedescribed action has taken place after return of power, the thermostat 10 is still in its "on" position, the damper motor 4 will continue to rotate to raise the damper 6, although the protective switch device is now in its original position and ready for action in case the source of power again fails. The circuit for the damper motor 4 to raise the damper 6 can be traced from one side of the source of power 40, conductors 42 and 44, damper motor 4, conductors 46 and 48, arm 12 and contacts 14 and 16 of the thermostat 10, conductor 58, brush 34, conducting plate 20 brush 32 of the commutating device 18, and conductors 54 and 56 to the other side of the source of power 40.

If at the time of restoration of power the thermostat 10 is in its "off" position, the same sequential action as above described will take place, since the contacts of the switch 64 are in shunt to the "off" contacts 14 and 16 of the thermostat.

If a power failure occurs when the room thermostat 10 is in its "off" position, there is no need for the protective device to act and it will not act because there will be no weight on the chain 38 effective to lift the lever arm 82, since the damper 6 is already in its closed position.

It will accordingly be seen that one of the great advantages of the proposed protective system and protective device lies in the fact that it only comes into play when necessary, and after it has acted in response to a power failure, it restores the functioning of the normal damper control system.

The proposed protective switching device 2 is capable of many modifications. One such modification is illustrated in Fig. 4 showing a slightly different construction of the end of the lever arm 82. In this case, the tip of the lever arm 82 is formed as a pawl 120 pivoted thereto at 122 and pressed by a spring 124 against an abutment 126. When such an arrangement is used, the spring 100 need not be present to move the pole-face 98 of the lever arm 94 away from the solenoid 62 to such a degree as illustrated in Fig. 3. Even if upon the restoration of power the lever arm 94 is returned to its locking position before the lever arm 82 has descended to its original normal position the spring pressed pawl 120, being yieldable in the counter-clockwise direction, permits complete return of the lever arm 82 under the action of the spring 88.

While it has not been illustrated, it will be obvious to those skilled in this art that the solenoid 62 might act directly upon the end of lever arm 82, without the use of the intermediate locking arm 94. In this case a suitable pole-face would be provided on the lever arm 82.

In accordance with a preferred arrangement, the protective switching device may be mounted within a box (not shown) near the ceiling of the basement, the box protecting the mechanism from dirt and moisture. The pulleys 76 and 80 are not necessary for proper movement of the lever arm 82 as long as the chain 38 exert a force in the proper direction upon the pulley 78 under action of the weight of the damper 6. If the pulleys 76 and 80 are used, however, proper movement of the lever arm 82 is assured.

The source of power has been generally indicated at 40. This source of power is preferably a transformer connected to the usual power lines, although any source of power can be used provided the damper and solenoid coil are designed therefor.

While it has not been illustrated, it will be obvious to those skilled in this art, that the damper motor 4 may be positioned with another controlling arm mounted diametrically opposite to the rotating 36, which can be used to control the check damper of a furnace. In this case, the check damper will be closed when the draft damper is open and vice versa.

The type of commutating device illustrated as used with the damper motor 4, is only diagrammatically portrayed, and it is intended that any suitable construction for carrying the proper sequential energization of the control circuits may be used.

It is to be understood that the damper control arrangement illustrated, can be used by itself, or in any proper combination with other furnace control systems. Additionally, while particularly adapted for controlling a furnace damper, the arrangement is obviously applicable to the control of any other combustion controlling means for a furnace.

While I have herein shown and described only certain embodiments of certain features of my present invention, it is to be understood that they are to be regarded merely as illustrative and that I do not intend to limit myself thereto except as may be required by the following claims:

1. In a heat-control system of the type wherein a thermostat controls a damper-controlling motor connected to a source of power, the combination of means responsive to a failure of the power source for causing closure of the damper if open in response to the call of thermostat, and simultaneously establishing a circuit to insure restarting of the motor in the damper-closing direction upon return of the power and the call of the thermostat, for re-setting said power-failure responsive means to its position before power failure.

2. In a damper-controlling system, in combination, a motor, a crank-arm adapted to be driven by said motor, a furnace damper, a chain interconnecting said crank-arm with said damper for raising and lowering the latter, a source of power, switching means for connecting said motor to said source of power for actuating said motor to raise and lower said damper, a releasable guide for said chain subjected to the weight of said damper when in its raised position, and means responsive to the source of power for restraining movement of said guide by said raised damper.

3. The combination according to claim 2, in which said last means includes a solenoid directly connected to the source of power.

4. The combination according to claim 2, in combination with a pivotally mounted lever arm, and means for mounting said guide on said lever arm, and in which said last means acts upon said guide by restraining movement of said lever arm.

5. The combination according to claim 2, in combination with a switch device, means for actuating said switch device upon movement of said guide from its restrained position, and conductors connecting said switch to said motor and source of power to insure movement of said motor to the damper-lowering position upon restoration of said source of power to remove the effect of the weight of said damper on said guide, and means for returning said guide to its restrained position.

6. In a safety damper-control system of the class including a source of power, a motor, a damper, means including a chain for raising and lowering said damper by said motor, a commutating device driven by said motor, a single-pole thermo-responsive switch having "on" and "off" contacts, and conductors interconnecting said motor, commutating device and switch to said source of power for rotating said motor to raise said damper when said switch is in its "on" position and to lower said damper when the switch is in its "off" position, the combination with a releasable guide for said chain subjected to the weight of said damper when in its raised position, and means responsive to the source of power for restraining movement of said guide, but releasing said guide upon power failure to permit closing of said damper.

7. The combination according to claim 6, in combination with a second switch adapted to be closed upon release of said guide, and conductors for connecting said second switch in shunt with the "off" contacts of said thermo-responsive switch.

8. The combination according to claim 6, in combination with means for returning said guide to its restrained position upon the restoration of power.

9. In a damper-control system, in combination, a source of power, a damper movable between open and closed positions, an electrical device connected to said source of power, mechanical means interconnecting said electrical device with said damper for opening and closing the same, and means acting upon said mechanical means for causing closure of said damper in response to failure of said source of power, said last means including a releasable guide, and said mechanical means including a chain adapted to move said guide in the open position of said damper.

10. In a damper controlling system, in combination, a motor, a crank-arm connected for rotation by said motor, a furnace damper, a chain interconnecting said crank-arm with said damper for raising and lowering the latter, a source of power, switching means for connecting said motor to said source of power for actuating said motor to raise or lower said damper, a releasable guide for said chain positioned intermediate said crank-arm and said damper and urged in a chain-slackening direction by the weight of said damper in its raised position, and means responsive to the source of power for restraining movement of said guide, whereby upon a power failure when the damper is in its raised position said guide will be released to slacken said chain and lower said damper.

11. The combination according to claim 10, in combination with means operated upon movement of said guide to establish a circuit for said motor in the damper-lowering direction, whereby upon restoration of power said crank-arm will be rotated to remove the effect of the weight of said damper on said guide, and means for returning said guide to its restrained position.

12. In a releasable safety device, in combination, a pivotally mounted lever arm, a second lever arm pivotally mounted in juxtaposition to said first lever arm, said second lever arm having a stop member adapted to prevent the rotation of said first lever arm in one direction, spring means urging said second lever arm for rotation in a direction to remove said stop from the path of said first lever arm, a solenoid for normally holding said second lever arm in its stop-engaging position, and means for urging said first lever arm toward said second lever arm, whereby said first lever arm acts upon the second lever arm to return said second arm to its normally holding and stop-engaging position.

13. In a damper controlling system, a motor, a crank arm adapted to be driven by said motor, a furnace damper, means interconnecting said crank arm with said damper for alternately opening and closing the latter upon rotation of said motor and crank arm in one direction, a source of power, switching means for connecting said motor to said source of power for actuating said motor to open or close said damper, and means operable upon said interconnecting means and responsive to a failure of the power source for causing closure of the damper if open in response to the position of said switching means, independently of the position of said crank arm.

14. In a safety damper-control system of the class including a source of power, a motor, a damper, means for opening and closing said damper by said motor, a commutating device driven by said motor, a single-pole thermo-responsive switch having "on" and "off" contacts, and conductors interconnecting said motor, commutating device and switch to said source of power for rotating said motor to open said damper when said switch is in its "on" position and to close said damper when said switch is in its "off" position, the combination with means responsive to a failure of the source of power for causing a closure of the damper if open in response to the call of the thermo-responsive switch and simultaneously establishing a shunt circuit about the "off" contact of said switch.

15. In a releasable safety device, in combination, a pivotally mounted lever arm, a pawl on the end of said lever arm, stop means for preventing movement of said pawl in one direction, spring means for urging said pawl toward said stop means, a second lever arm pivotally mounted in juxtaposition to said first lever arm, said second lever arm having an extension adapted to engage said pawl and move it toward said stop means to prevent rotation of said first lever arm in one direction, a solenoid for normally holding said second lever arm in its pawl-engaging position, and means for urging said first lever arm toward said second lever arm, whereby said first lever arm acts upon the second lever arm to return said second lever arm to its normally holding and pawl-engaging position.

JOHN T. CARLSON.